United States Patent
Yang et al.

(10) Patent No.: US 10,342,047 B2
(45) Date of Patent: Jul. 2, 2019

(54) REVERSE DIRECTION FOR MULTI-USER MULTIPLE INPUT MULTIPLE OUTPUT COMMUNICATIONS

(71) Applicant: Intel IP Corporation, Santa Clara, CA (US)

(72) Inventors: Ou Yang, Santa Clara, CA (US); Oren Kedem, Modiin Maccabim-Reut (IL); Solomon Trainin, Haifa (IL); Chittabrata Ghosh, Freemont, CA (US); Carlos Cordeiro, Portland, OR (US); Laurent Cariou, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/394,029

(22) Filed: Dec. 29, 2016

(65) Prior Publication Data

US 2018/0019792 A1    Jan. 18, 2018

Related U.S. Application Data

(60) Provisional application No. 62/363,596, filed on Jul. 18, 2016, provisional application No. 62/380,672, filed on Aug. 29, 2016.

(51) Int. Cl.
*H04W 72/04* (2009.01)
*H04L 1/16* (2006.01)
(Continued)

(52) U.S. Cl.
CPC ...... *H04W 74/0816* (2013.01); *H04B 7/0452* (2013.01); *H04L 1/1664* (2013.01);
(Continued)

(58) Field of Classification Search
CPC ... H04L 1/1671; H04L 1/1685; H04L 5/0055; H04W 74/0816; H04W 28/0268; H04B 7/0452
See application file for complete search history.

(56) References Cited

U.S. PATENT DOCUMENTS

2007/0002810 A1* 1/2007 Trainin ............... G01V 1/303
    370/338
2009/0252110 A1* 10/2009 Sridhara ............ H04L 1/1854
    370/330

(Continued)

OTHER PUBLICATIONS

IEEE 802.11-10/1092r0, ACK Protocol and Backoff Procedure for MU-MIMO, Sep. 2010.*
(Continued)

*Primary Examiner* — Aristocratis Fotakis
(74) *Attorney, Agent, or Firm* — Eversheds Sutherland (US) LLP

(57) ABSTRACT

This disclosure describes systems, methods, and devices related to reverse direction multi-user multiple input multiple output (MU-MIMO). A device may determine a reverse direction indication to be included in a frame for transmission to one or more first devices in a MU-MIMO communication. The device may cause to wirelessly transmit the frame to a first device of the one or more first devices. The device may identify an acknowledgment frame from the at least one of the first devices based at least in part on the reverse direction indication

18 Claims, 13 Drawing Sheets

(51) Int. Cl.
H04W 74/08 (2009.01)
H04B 7/0452 (2017.01)
H04W 84/12 (2009.01)
(52) U.S. Cl.
CPC ......... *H04L 1/1685* (2013.01); *H04W 72/042* (2013.01); *H04W 72/0446* (2013.01); *H04L 1/1628* (2013.01); *H04W 84/12* (2013.01)

(56) References Cited

U.S. PATENT DOCUMENTS

| | | | | |
|---|---|---|---|---|
| 2012/0213308 | A1* | 8/2012 | Merlin | H04L 1/1621 375/295 |
| 2013/0034061 | A1* | 2/2013 | Xie | H04W 72/1284 370/329 |
| 2013/0250904 | A1* | 9/2013 | Kang | H04B 7/0452 370/329 |
| 2014/0064255 | A1* | 3/2014 | Trainin | H04W 72/0446 370/336 |
| 2014/0086227 | A1* | 3/2014 | Yang | H04W 72/1268 370/338 |
| 2015/0003239 | A1* | 1/2015 | Gong | H04L 1/1685 370/230 |
| 2016/0330007 | A1* | 11/2016 | Cherian | H04L 5/0055 |
| 2017/0207905 | A1* | 7/2017 | Eitan | H04L 7/0276 |

OTHER PUBLICATIONS

IEEE 802.11-16/1502r1, Reverse Direction for DL MU MIMO, Intel, Nov. 2016.*

* cited by examiner

REVERSE DIRECTION FOR MULTI-USER MULTIPLE INPUT MULTIPLE OUTPUT COMMUNICATIONS

CROSS-REFERENCE TO RELATED APPLICATIONS

This application claims the benefit of U.S. Provisional Application No. 62/363,596 filed Jul. 18, 2016, and U.S. Provisional Application No. 62/380,672 filed Aug. 29, 2016, the disclosure of which are incorporated herein by reference as if set forth in full.

TECHNICAL FIELD

This disclosure generally relates to systems and methods for wireless communications and, more particularly, to reverse direction for multi-user multiple input multiple output (MU-MIMO).

BACKGROUND

Wireless devices are becoming widely prevalent and are increasingly requesting access to wireless channels. The growing density of wireless deployments require increased network and spectrum availability. Wireless devices may communicate with each other using directional transmission techniques, including but not limited to beamforming techniques. Wireless devices may communicate over a next generation 60 GHz (NG60) network, an enhanced directional multi-gigabit (EDMG) network, and/or any other network.

DETAILED DESCRIPTION

Figure 1:
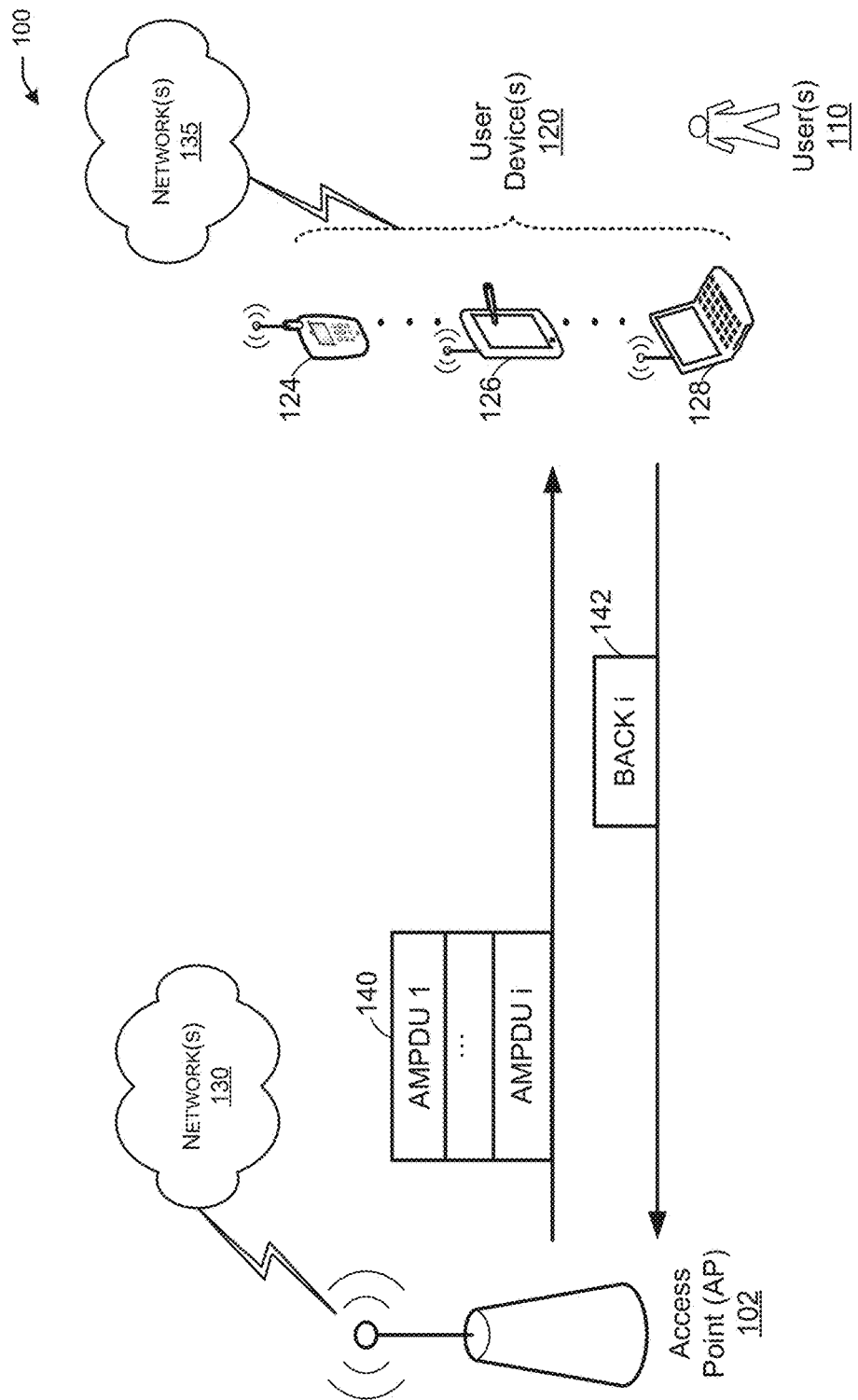
FIG. 1 depicts a network diagram illustrating an example network environment for reverse direction MU-MIMO, in accordance with one or more example embodiments of the present disclosure.

Example embodiments described herein provide certain systems, methods, and devices for reverse direction MU-MIMO communications. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Devices may communicate over a next generation 60 GHz (NG60) network, an enhanced directional multi-gigabit (EDMG) network, and/or any other network. Devices operating in EDMG may be referred to herein as EDMG devices. This may include user devices, and/or APs or other devices capable of communicating in accordance to a communication standard, including but not limited to IEEE 802.11ad and/or IEEE 802.11ay.

IEEE 802.11ac supports downlink (DL) MU-MIMO. However, reverse direction (RD) is not enabled for IEEE 802.11ac MU-MIMO transmissions. IEEE 802.11ax also supports DL MU-MIMO, but the uplink traffic is sent using UL MU-MIMO, which is different from IEEE 802.11ay.

Enabling RD for MU-MIMO may increase the uplink channel access efficiency. It may improve throughput, and significantly improve user experience in applications such as virtual reality where multiple players are MU-MIMO station devices (STAs) and the game console serves as the access point (AP) or a personal basic service set (PBSS) control point (PCP). Such applications require large DL bandwidth to support video quality, and at the same time require tight UL delay to guarantee prompt reaction to user's motion.

Currently, there is no support for enabling RD for MU-MIMO communications, where a device may be simultaneously communicating with multiple devices such that the DL communication is from one to many and the UL communications are from many to one.

Example embodiments of the present disclosure relate to systems, methods, and devices for reverse direction (RD) MU-MIMO.

A directional multi-gigabit (DMG) communications may involve one or more directional links to communicate at a rate of multiple gigabits per second, for example, at least 1 gigabit per second, 7 gigabits per second, or any other rate. An amendment to a DMG operation in a 60 GHz band, e.g., according to an IEEE 802.11ad standard, may be defined, for example, by an IEEE 802.11ay project.

In some demonstrative embodiments, one or more devices may be configured to communicate over a next generation 60 GHz (NG60) network, an enhanced DMG (EDMG) network, and/or any other network. For example, the one or more devices may be configured to communicate over the NG60 or EDMG networks.

In one embodiment, a reverse direction (RD) MU-MIMO system may support RD for DL MU-MIMO transmissions. An RD MU-MIMO protocol may allow bi-directional communication between two or more devices during a transmit opportunity (TXOP) period by eliminating the need for either device to initiate a new data transfer. For example, during communications between an initiating device, such as an AP, and multiple responding devices (e.g., STAs), the multiple responding devices would be able to utilize the RD MU-MIMO system and send their data to the initiating device without having to go through channel access delay using, for example, a backoff timer to stay away from the channel while the channel is still busy. Without the RD MU-MIMO protocol, each unidirectional data transfer required each responding device to follow channel access delays in order to send its UL data. With RD, once the initiating device has obtained a TXOP, it may grant permission to the other devices to send information back during the initiating device's TXOP period. It should be noted that the initiating device is the owner of the DL MU MIMO TXOP. In this type of communication, two roles for each of the devices may be defined, an RD initiator and an RD responder. The RD initiator may send its permission to the RD responder to send its data in the reverse direction using, for example, a reverse direction grant (RDG). The RD responder may signal whether or not it will be sending data in the reverse direction.

In one embodiment, the RD MU-MIMO system may use MU-MIMO to deliver data from an RD initiator (e.g., an AP) to multiple RD responders (e.g., STAs), where an RDG may be signaled by the RD initiator to each of the RD responders. For example, the RD MU-MIMO system may utilize one or more MU PPDUs that are addressed to the RD responders in order to signal to the RD responders using RDG that at least one of the RD responders is authorized to transmit data in the uplink direction during the same TXOP of the RD initiator.

In another embodiment, the RD MU-MIMO system may aggregate a block acknowledgment request frame with a quality of service (QoS) frame (e.g., QoS-Null frame). The QoS frame includes an RDG field that may be set in order to authorize or otherwise signal to the recipient of the aggregated frame to transmit data in the uplink direction during the same TXOP of the RD initiator.

In one embodiment, the RD MU-MIMO system may utilize a block acknowledgment (BA) in order to respond to the RD initiator and in some cases to aggregate or otherwise piggyback RD data to the BA. If the RD data traffic sent from the RD responder to the RD initiator requires a response, the RD initiator may send BA to the RD responder.

In one embodiment, the RD MU-MIMO system may send a response to an RD responder that may have sent RD data to an RD initiator using a BA address to the RD responder, in addition or simultaneously with a BAR designated for another RD responder in an MU-MIMO fashion (e.g., when the RD initiator is simultaneously communicating with multiple RD responders).

In one embodiment, the RD MU-MIMO system may send a standalone BA to the RD responder, which may then be followed by a BAR to another RD responder. The RD MU-MIMO system may, in this case be sequentially sending the standalone BA and the BAR to two RD responders.

In another embodiment, the RD MU-MIMO system may piggyback the BA to the RD responder in the next MU PPDU that the RD initiator will send to the RD responder within the TXOP.

In another embodiment, the RD MU-MIMO system may indicate the order in which each RD responder in the MU-MIMO communication with the RD initiator should send its BA. In some embodiments, the RD responders are polled by the RD initiator and then the RD initiator would indicate the order using a BAR sent to each of the RD responders.

In another embodiment, the RD MU-MIMO system may indicate in one of its MU PPDU sent to a first RD responder from multiple RD responders involved in the MU-MIMO communication with the RD initiator, where the acknowledgment (ACK) policy is set to indicate for the first RD responder that it is to immediately send a BA when it receives its MU PPDU. An ACK policy value of 00 may indicate immediate block acknowledgment. The RD initiator set the ACK policy to indicate to the rest of the RD responders that they should wait until they receive their corresponding BAR from the RD initiator. An ACK policy value of 11 may indicate that the device receiving this indication, should wait until the RD initiator sends it a BAR.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment, in accordance with one or more example embodiments of the present disclosure. Wireless network 100 may include one or more user device(s) 120 and one or more access point(s) (AP) 102, which may communicate in accordance with IEEE 802.11 communication standards, such as the IEEE 802.11ad and/or IEEE 802.11ay specifications. The user device(s) 120 may also be referred to as station devices (STAs). The user device(s) 120 may be mobile devices that are non-stationary and do not have fixed locations. Although the AP 102 is shown to be communicating on multiple antennas with user devices 120, it should be understood that this is only for illustrative purposes and that any user device 120 may also communicate using multiple antennas with other user devices 120 and/or AP 102.

Figure 9:
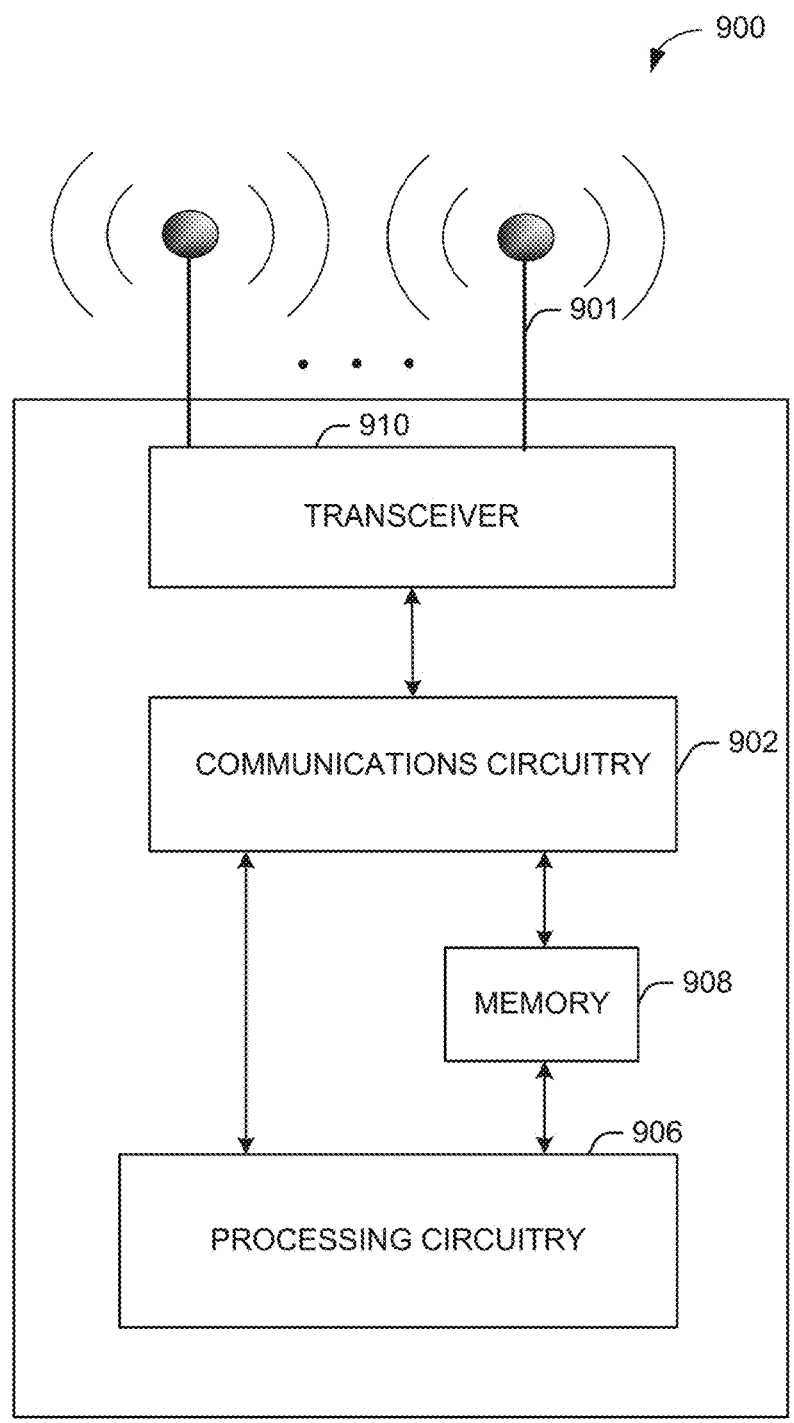
FIG. 9 illustrates a functional diagram of an example communication station that may be suitable for use as a user device, in accordance with one or more example embodiments of the present disclosure.
Figure 10:
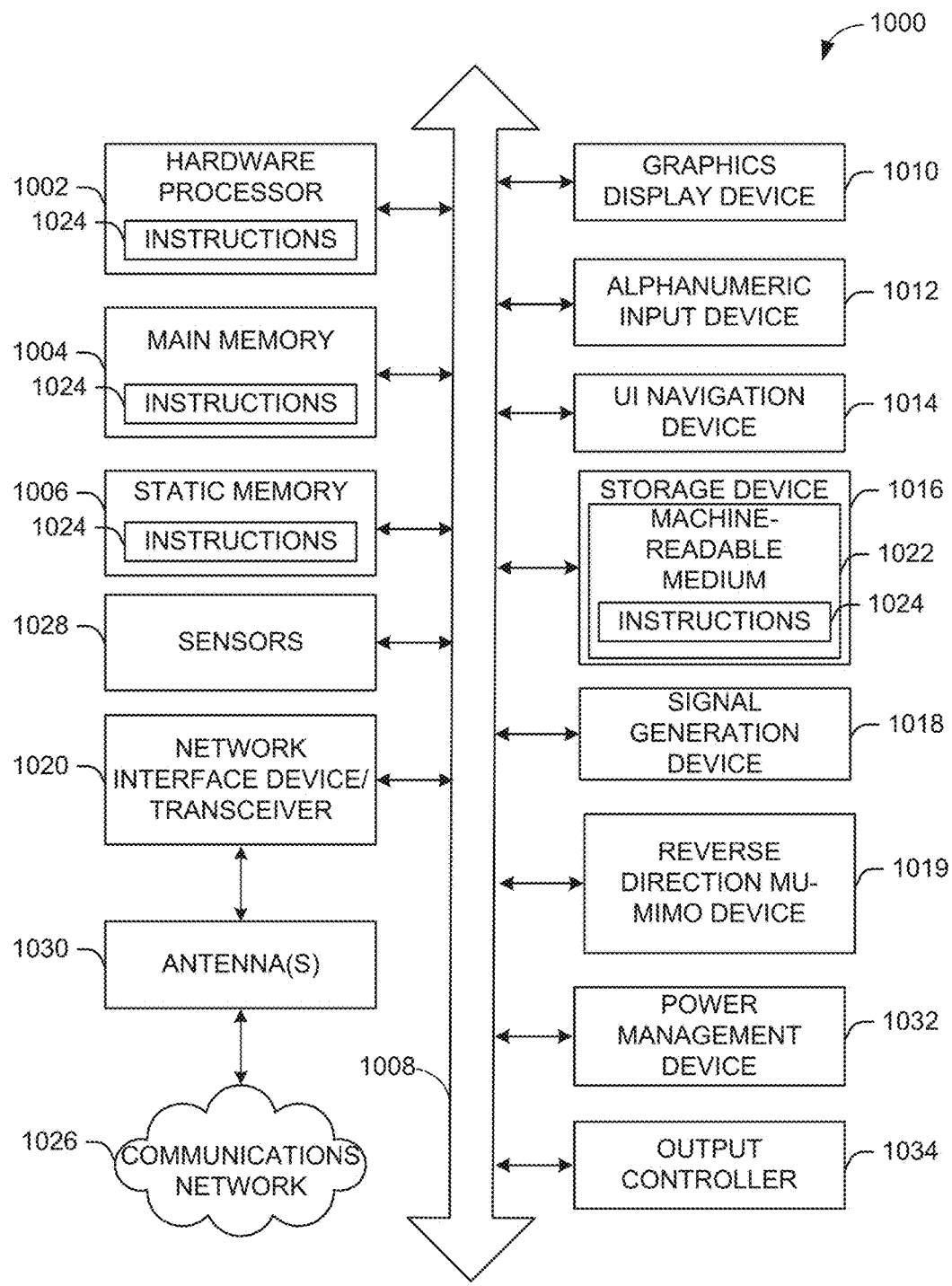
FIG. 10 is a block diagram of an example machine upon which any of one or more techniques (e.g., methods) may be performed, in accordance with one or more example embodiments of the present disclosure.

In some embodiments, the user devices 120 and AP 102 may include one or more computer systems similar to that of the functional diagram of FIG. 9 and/or the example machine/system of FIG. 10.

One or more illustrative user device(s) 120 and/or AP 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP 102 may operate as a personal basic service set (PBSS) control point/access point (PCP/AP). It should be noted that actions taken by the AP may also be taken by the PCP. However, for ease of use, references are made to the actions of the AP. The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices such as lamps, climate control, car components, household components, appliances, etc. may also be included in this list.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennas. The one or more communications antennas may be any suitable type of antennas corresponding to the communications protocols used by the user device(s) 120 (e.g., user devices 124, 126 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP 102.

Any of the user device(s) 120 (e.g., user devices 124, 126, 128), and AP 102 may be configured to perform directional transmission and/or directional reception in conjunction with wirelessly communicating in a wireless network. Any of the user device(s) 120 (e.g., user devices 124, 126, 128), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP 102 may be configured to perform any given directional transmission towards one or more defined transmit sectors. Any of the user device(s) 120 (e.g., user devices 124, 126, 128), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Multi-user MIMO (MU-MIMO) may be a set of multiple-input multiple-output technologies for wireless communication, in which a set of devices, each having one or more antennas, communicate with each other.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Some demonstrative embodiments may be used in conjunction with a wireless communication network communicating over a frequency band of 60 GHz. However, other embodiments may be implemented utilizing any other suitable wireless communication frequency bands, for example, an extremely high frequency (EHF) band (the millimeter wave (mmWave) frequency band), a frequency band within the frequency band of between 20 GHz and 300 GHz, a WLAN frequency band, a WPAN frequency band, a frequency band according to the WGA specification, and the like.

The phrases "directional multi-gigabit (DMG)" and "directional band (DBand)", as used herein, may relate to a frequency band wherein the channel starting frequency is above 45 GHz. In one example, DMG communications may involve one or more directional links to communicate at a rate of multiple gigabits per second, for example, at least 1 gigabit per second, 7 gigabits per second, or any other rate.

Media access control protocol data unit (MPDU) is a message (protocol data unit) exchanged between media access control (MAC) entities in a communication system based on the layered Open Systems Interconnection model. In systems where the MPDU may be larger than the MAC service data unit (MSDU), the MPDU may include multiple MSDUs as a result of packet aggregation. In systems where the MPDU is smaller than the MSDU, then one MSDU may generate multiple MPDUs as a result of packet segmentation.

An AMPDU is an aggregation of one or more MPDUs, which are information that is delivered as a unit among entities in a network and that may contain control information, such as address information, or user data. One purpose for using an aggregated MPDU is to allow multiple MPDUs to be sent to the same receiving device concatenated in a single MPDU (e.g., AMPDU).

A physical layer convergence protocol (PLCP) data unit (PPDU) is an MPDU having additional preamble and header in order to be a message at the PHY layer between peer entities in a communication system.

In some demonstrative embodiments, the user device(s) 120 and/or the AP 102 may be configured to operate in accordance with one or more specifications, including one or more IEEE 802.11 specifications, (e.g., an IEEE 802.11ad specification, an IEEE 802.11ay specification, and/or any other specification and/or protocol). For example, an amendment to a DMG operation in the 60 GHz band, according to an IEEE 802.11ad standard, may be defined, for example, by an IEEE 802.11ay project.

In one embodiment, and in reference to FIG. 1, and AP 102 may be involved in an MU-MIMO communication with multiple user devices 120 (e.g., user devices 124, 126, and 128). The AP 102 may communicate with the user devices 120 AMPDUs during a TXOP assigned for the AP 102. The RD MU-MIMO system may facilitate communication in the reverse direction, going the same TXOP assigned to the AP 102, based at least in part on indications used by the AP 102 to notify the user devices 120 when and how to communicate in the reverse direction. For example, in FIG. 1, there is shown one or more AMPDUs 140 (e.g., AMPDU 1 . . . AMPDU i, where i being a positive integer) that may be sent from an RD initiator device (e.g., AP 102 and/or user device 120) to one or more RD responder devices (e.g., AP 102 and/or user device 120), which may be in communication with each other using MU-MIMO communication. At least one of the one or more RD responder devices may respond with a block acknowledgment (BACK) (e.g., BACKi 142). Based at least in part on the indications provided by the RD initiator device to the RD responder devices. It should be understood that although in this example, MPDUs are used to showcase the embodiments of the disclosure, PPDUs, which are associated with the MPDU's with additional preamble and header in order to be transmitted at the PHY layer between devices.

It is understood that the above descriptions are for purposes of illustration and are not meant to be limiting.

Figure 2:
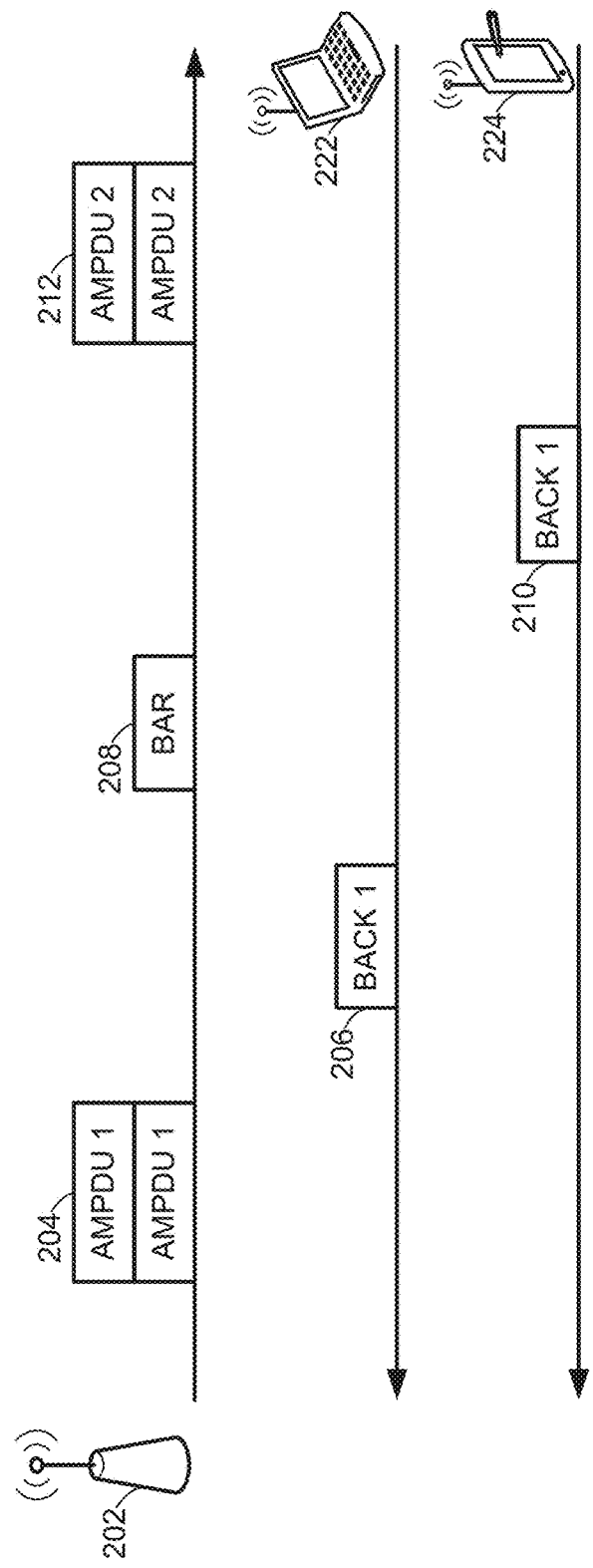
FIG. 2 depicts an illustrative schematic diagram of a reverse direction MU-MIMO system using one or more block acknowledgement implementations, in accordance with one or more example embodiments of the present disclosure.

FIG. 2 depicts an illustrative schematic diagram of a reverse direction MU-MIMO system using one or more block acknowledgement implementations, in accordance with one or more example embodiments of the present disclosure.

Referring to FIG. 2, there is shown an IEEE 802.11ac implementation for DL MU-MIMO block acknowledgement (BACK) from two devices (e.g., user device 222 and user device 224) in a MU-MIMO group with another device (e.g., AP 202). However, it should be noted that no reverse direction is enabled in this implementation of DL MU-MIMO block acknowledgment. It should be noted that actions taken by the AP may also be taken by the PCP. However, for ease of use, references are made to the actions of the AP.

The example of FIG. 2 shows a scenario for receiving acknowledgments from the one or more devices that may be in a MU-MIMO communication may include one or more actions taken by the AP 202 and one or more actions taken by the user device 222 and user device 224. For example, the AP 202 may send MU PPDUs (e.g., AMPDUs 204) to user device 222 and user device 224. In this case, one of the user devices (e.g., user device 222) in the MU-MIMO group may be indicated to immediately send block acknowledgment (e.g., BACK 206), after a channel access delay, for example, an inter-frame space (IFS), such as short IFS (SIFS) or any other duration, after the AMPDUs 204 sent by the AP 202. After the AP 202 receives the BACK 206 from user device 222, the AP 202 may send a BAR 208 to request from the other device (e.g., user device 224), whose block acknowledgment (e.g., BACK 210) has not been collected. The user device 224 may receive the BAR 208 and may respond with its block acknowledgment (e.g., BACK 210). The AP 202 may continue to send BAR to other devices if they belong to the MU-MIMO group. Otherwise, the AP 202 may send the next MU PPDU (e.g., AMPDUs 212).

Further, in IEEE 802.11ad, an ACK policy is defined that may also allow an AP (or a PCP) to collect one block acknowledgment (from one user device in the MU-MIMO group) on a per MU PPDU basis. However, it should be noted that no reverse direction is enabled in this implementation of DL MU-MIMO block acknowledgment.

The AP 202 may send an MU PPDU to a group of MU-MIMO user devices. In the MU PPDU, the AP/PCP may set the ACK policy to 00 (normal ACK or implicit BAR) to only one of the MU-MIMO user devices, and may set the ACK policy to 11 to the rest of the user devices in the MU-MIMO group. The user device that receives the MU PPDU with ACK policy 00 may respond to the AP/PCP with BACK after the passage of a SIFS time. User devices that receive the MU PPDU with ACK Policy 11 may record the state and will not respond with a BACK until instructed by the AP/PCP using the BAR. The AP/PCP may receive the BACK from one user device, and may continue sending the next MU PPDU to the group of MU-MIMO user devices. In the MU PPDU, the AP/PCP may set ACK policy to 00 for another user device in the MU-MIMO group, and set ACK policy to 11 to the rest of the user devices in the MU-MIMO group. In fact, the AP/PCP may collect BACK from only one user device after sending each MU PPDU, and the AP/PCP may collect BACK from user devices in a round-robin fashion. It should be understood that an ACK policy value of 00 may indicate immediate block acknowledgment (BACK). An ACK policy value of 11 may indicate that the device receiving this indication, should wait before sending its BACK until the RD initiator sends it the BAR.

Figure 3A:
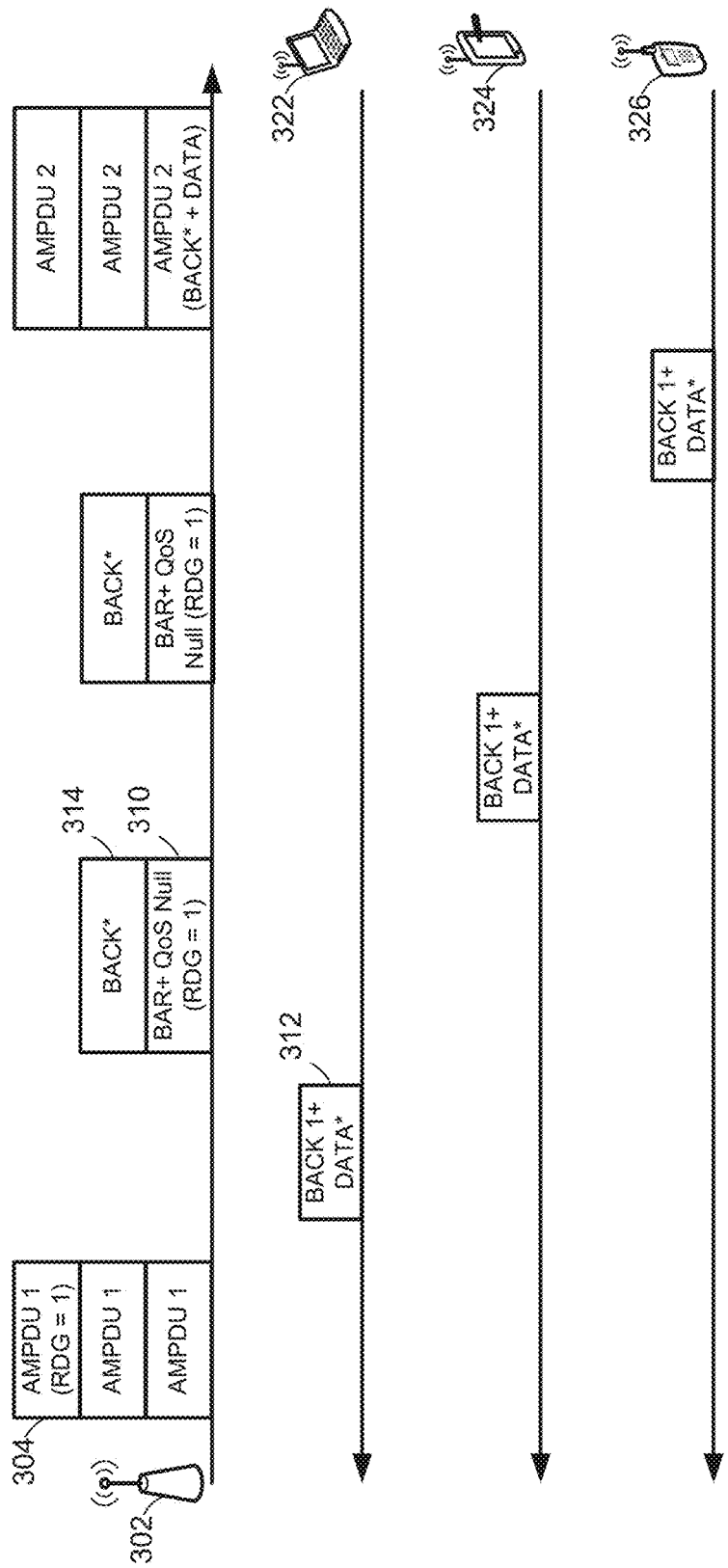
FIGS. 3A-3B depict illustrative schematic diagrams of a reverse direction MU-MIMO system, in accordance with one or more example embodiments of the present disclosure.
Figure 3B:
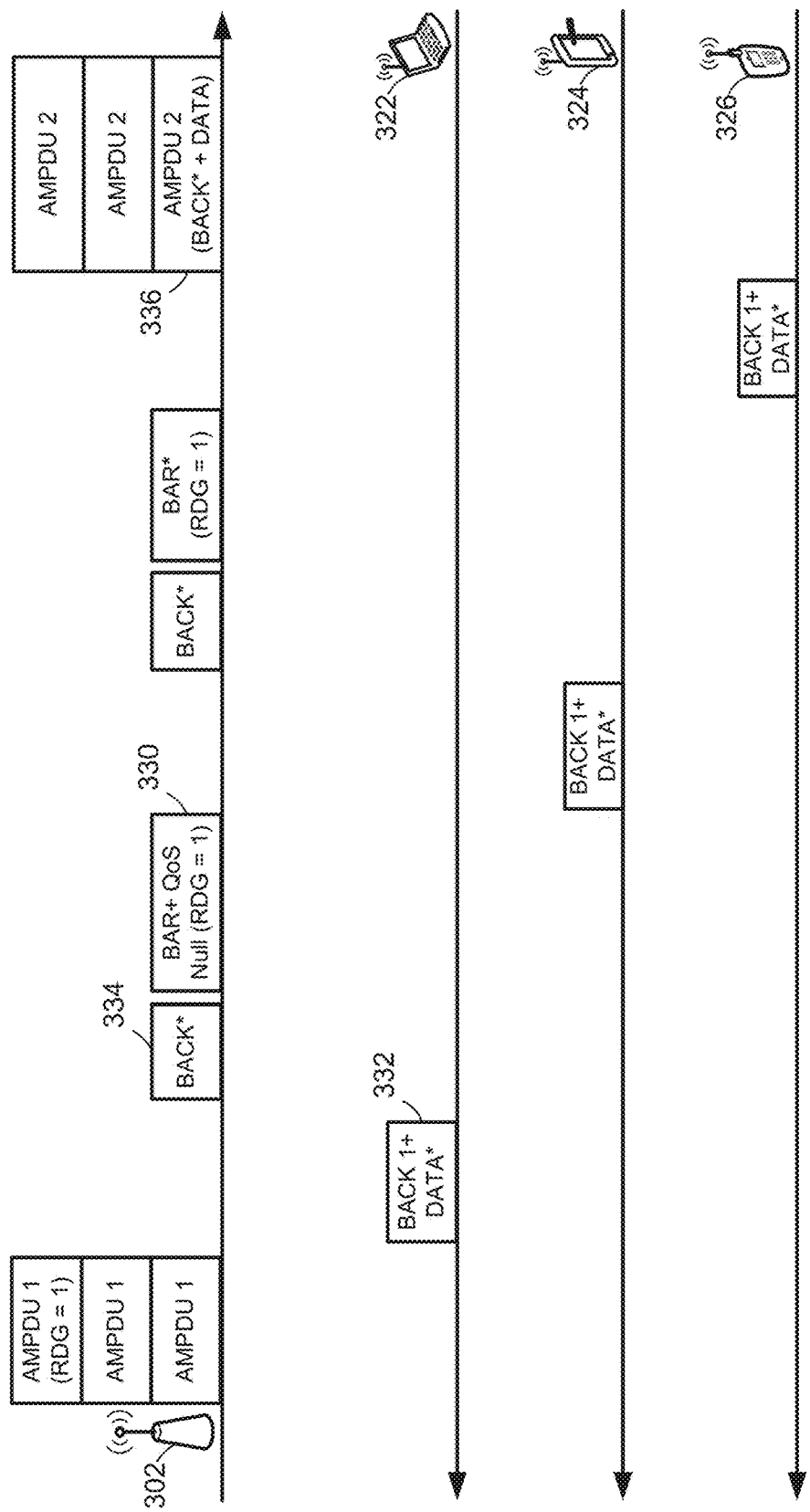

FIGS. 3A-3B depict illustrative schematic diagrams for an RD MU-MIMO system, in accordance with one or more example embodiments of the present disclosure.

Referring to FIG. 3A, there is shown in RD initiator device (e.g., AP 302 or PCP) and three RD responder devices (e.g., user devices, clear 322, 324, and 326), which may be part of a MU-MIMO group. The AP 302 may be communicating with the user devices 322, 324, and 326 during a TXOP period allocated for the AP 302. It should be noted that actions taken by the AP may also be taken by the PCP. However, for ease of use, references are made to the actions of the AP.

In one embodiment, an RD MU-MIMO system may facilitate an RD initiator device to enable RD for MU-MIMO with one or more RD responder devices. In one embodiment, an RD MU-MIMO system may allow N user devices to be granted RD for one MU PPDU, where N is a positive integer less than or equal the number of user devices in the MU-MIMO group.

In one embodiment, the AP 302 may set the RDG=1 (e.g., reverse direction granted) and the ACK Policy=0 0 in an MU PPDU (e.g., AMPDU 304) designated for one of the user devices (e.g., user device 322) in the MU-MIMO group. It should be noted that the Duration/ID field of the MU PPDU to this user device may be set to indicate the time allowed for the RD respond burst and any response if required.

In one embodiment, an RD MU-MIMO system may aggregate a BAR frame with a QoS-Null frame to form an aggregated frame (e.g., aggregated frame 310). Since a BAR frame does not include an RDG field in its header, in order to carry an RDG field, an AP may need to aggregate a BAR frame with a QoS-Null frame, which has an RDG field in its header, to form an A-MPDU. For example, the AP 302 may set RDG=1 in a BAR for one user devices (e.g., user device 324) in the MU-MIMO group. The Duration/ID field of the BAR to this user device should be set to indicate the time allowed for the RD respond burst and any response if required.

The user device 322 that is granted RD may start RD respond burst SIFS time after receiving the RD grant. That is the user device 322 may send a frame 312, which may be in aggregated BACK and RD data that the user device 322 wants to communicate to the AP 302.

After receiving the RD response burst, the AP 302 may then send an acknowledgment to the RD data that the user device 322, sent to the AP 302 by sending an acknowledgment frame (e.g., BACK 314), if required by the user device 322.

In one embodiment, the acknowledgment frame (e.g., BACK 314) may be sent to the user device 322 together or otherwise simultaneously with the aggregated frame 310 that was to be sent to the user device 324 using MU-MIMO. In this case, the RD responders (e.g., user devices 322, 324, and 326) in the MU-MIMO group keep their MU-MIMO antenna configuration during all non-transmitting time period of the TXOP.

Referring to FIG. 3B, the user device 322 that was granted permission to send its data in the reverse direction may send its data frame aggregated with a block acknowledgment (e.g., frame 332). In response to receiving the frame 332, the AP 302 may send the acknowledgment frame (e.g., BACK 334) as a standalone acknowledgment to the RD responder (user device 322), followed by frame 330, which may be an aggregation of BAR frame and a QoS_Null frame, which has an RDG field in its header, to the user device 324 in the MU-MIMO group. A null frame is a frame meant to contain no data but flag certain information. A QoS_Null frame is the QoS version of the null frame. In this case, the user devices in the MU-MIMO group may switch to SISO antenna configuration towards the AP 302 after receiving an MU PPDU. A user device in the MU-MIMO group may switch back to MU-MIMO antenna configuration once (a) it sends out its BACK frames if no RD grant (RDG=0), (b) when granted RD, it receives the BACK (or ACK) from the AP if its RD data requires a response, or (c) when granted RD, it sends out the BACK (or ACK) and RD DATA if its RD data does not require a response. It should be noted that the BACK (or ACK) may be aggregated with data, and sent as the next MU PPDU as shown in frame 336. It is understood that the above descriptions are for purposes of illustration and are not meant to be limiting.

Figure 4:
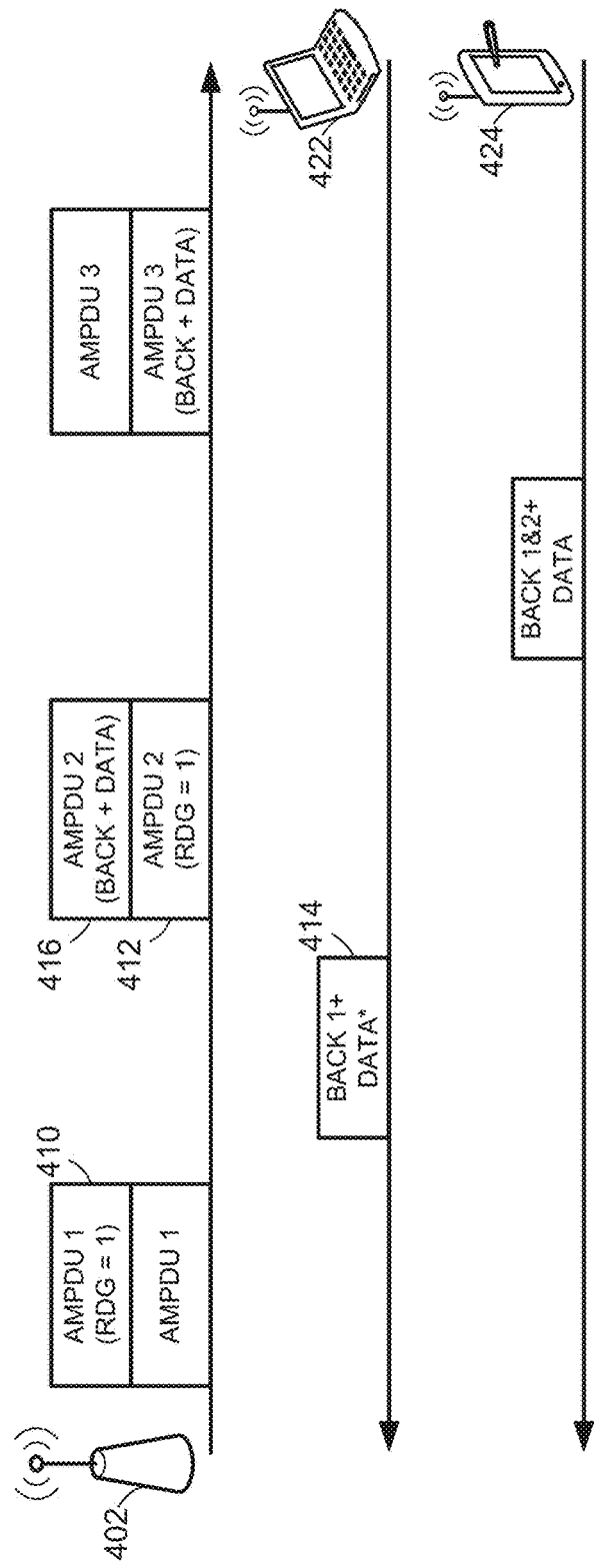
FIG. 4 depicts an illustrative schematic diagram for reverse direction MU-MIMO, in accordance with one or more example embodiments of the present disclosure.

FIG. 4 depicts an illustrative schematic diagram for an RD MU-MIMO, in accordance with one or more example embodiments of the present disclosure.

FIG. 4 illustrates that an AP (e.g., AP 402) may collect BACK and RD DATA in a round robin fashion among the MU MIMO user devices (e.g., user devices 422 and 424). Referring to FIG. 4, there is shown an example of an AP 402 (or a PCP) enabling RD for one or more RD responder devices (e.g., user devices 422 and 424) in an MU-MIMO groups. In this example, RD grant may be given in MU PPDU (e.g., frames 410, and 412), and the AP 402 may piggyback the BACK (or ACK) to the RD responder in the next MU PPDU. For example, in responding to frame 414, after user device for 422 was granted RD when it received frame 410, the AP 402 may piggyback a BACK (or ACK) in the next MU PPDU (e.g., frame 416). It should be noted that actions taken by the AP may also be taken by the PCP. However, for ease of use, references are made to the actions of the AP.

Figure 5:
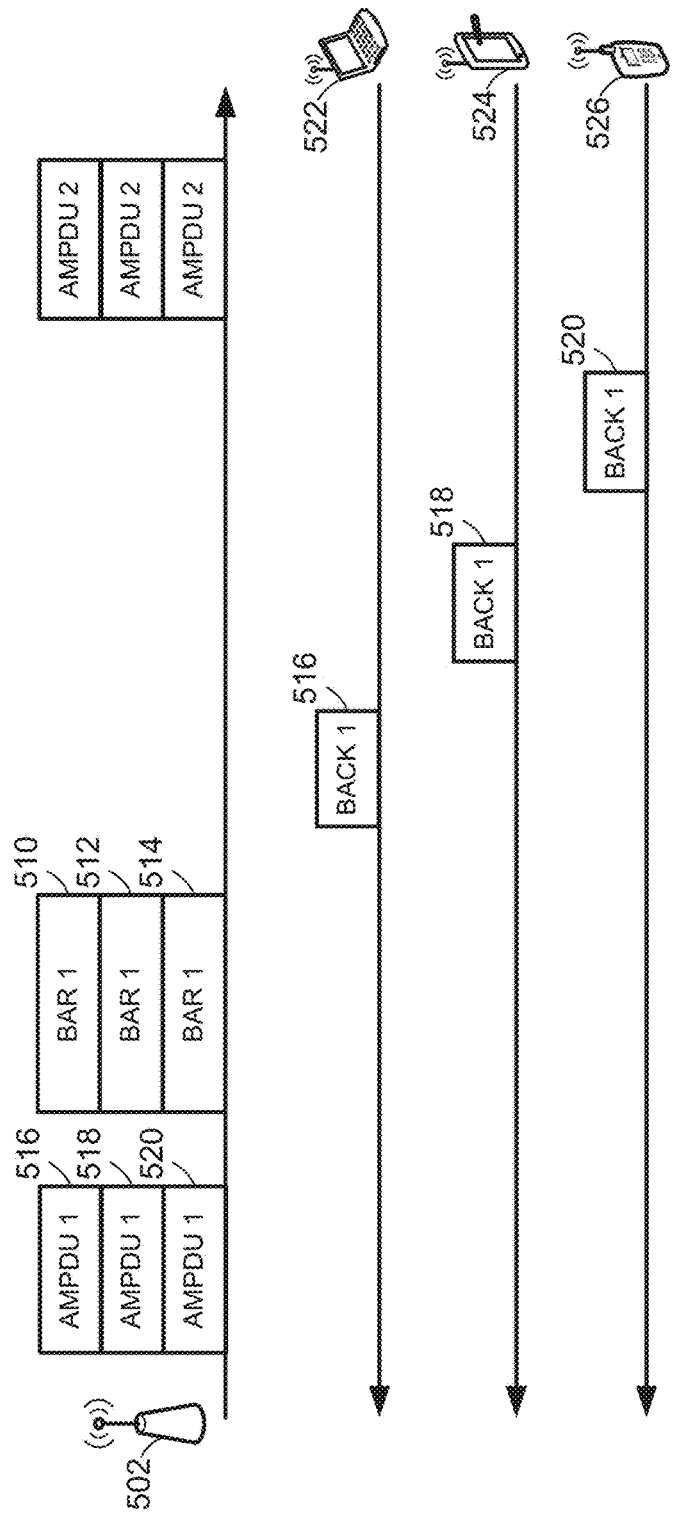
FIG. 5 depicts an illustrative schematic diagram for reverse direction MU-MIMO, in accordance with one or more example embodiments of the present disclosure.

FIG. 5 depicts an illustrative schematic diagram for an MU-MIMO group communications without RD data.

Referring to FIG. 5, there is shown an example with three user devices (e.g., user devices 522, 524, and 526) in an MU-MIMO group. The AP 502 may send three BAR frames (e.g., frames 510, 512, and 514) in an MU-MIMO fashion to all 3 RD responder devices after sending each of the three MU PPDUs (e.g., frames 516, 518, and 520). For example, the AP 502 may simultaneously send frames 516, 518, and 520 to user devices 522, 524 and 526 in a one to many MU-MIMO fashion. In this example, frames 516, 518, and 520 contains indication that none of the user devices 522, 524, and 526 shall send an immediate acknowledgement. However, the AP 502 may send the BAR frames 510, 512, and 514 using MU-MIMO to the user devices 522, 524 and 526. The AP 502 may encode or otherwise set a field in the BAR frames 510, 512, and 514 to indicate to the user devices 522, 524, and 526, the order that these user devices need to send their block acknowledgments. After receiving the BAR frames, the user devices 522, 524, and 526 may send their block acknowledgments sequentially according to the order indicated in at least one of the BAR frames (e.g., frames 510, 512, and 514).

In one embodiment, an RD MU-MIMO system may facilitate a design of MU-MIMO block acknowledgment according to two assumptions. First, there may be a mechanism for an RD initiator device (e.g., AP 502) to indicate the order in which each MU-MIMO group user sends its block acknowledgment. For example, BAR frame can be modified to carry the order information. Second, all the MU-MIMO group users (e.g., user devices 522, 524, and 526) may send block acknowledgment using a fixed predefined MCS, so that each MU-MIMO user device can calculate the time to start sending its block acknowledgment (e.g., BACK 516, 518, and/or 520) after obtaining its order of sending block acknowledgment. It is assumed that a BAR frame is used to indicate the order of sending BlockACK to MU-MIMO group users. The BAR frame may have its duration field covering all the following block acknowledgments and RD data transmissions so that all the RD responding devices (e.g., user devices 522, 524, and 526) that receive the BAR and that are not in the MU-MIMO group set their network allocation vectors (NAV) to avoid interfering the transmission of the following BlockACKs and RDs.

In one embodiment, an RD MU-MIMO system may facilitate that an RD initiator device (e.g., the AP 502 or a PCP) may send in an MU PPDU to a group of MU-MIMO RD responder devices (e.g., user devices 522, 524, and 526). In another embodiment, one RD responder device in the MU-MIMO group may send its block acknowledgment after receiving the MU PPDU from the AP 502 if the ACK policy for this RD responder device is set to 00, where the rest of the RD responder devices in the MU-MIMO group should have their ACK policy set to 11 in the received MU PPDU. It should be understood that an ACK policy value of 00 may indicate immediate block acknowledgment (BACK). An ACK policy value of 11 may indicate that the device receiving this indication, should wait before sending its BACK until the RD initiator sends it the BAR.

In another embodiment, the AP 502 may send the BAR frame(s) (e.g., BAR 510, BAR 512, and/or BAR 514) in MU-MIMO fashion (simultaneously to user device 522, 524, and 526) to the group, which indicates the order of the following block acknowledgments to be sent by the RD responding devices to the AP 502. It should be noted that other options of indicating the order of the following block acknowledgments may also be envisioned.

In one embodiment, the RD responder devices in the MU-MIMO group may acknowledge to a received MU PPDU by sending a block acknowledgment to the AP 502 to AP/PCP 502 sequentially, following the order indicated by AP 502 in the BAR frame(s). It is understood that the above descriptions are for purposes of illustration and are not meant to be limiting.

Figure 6:
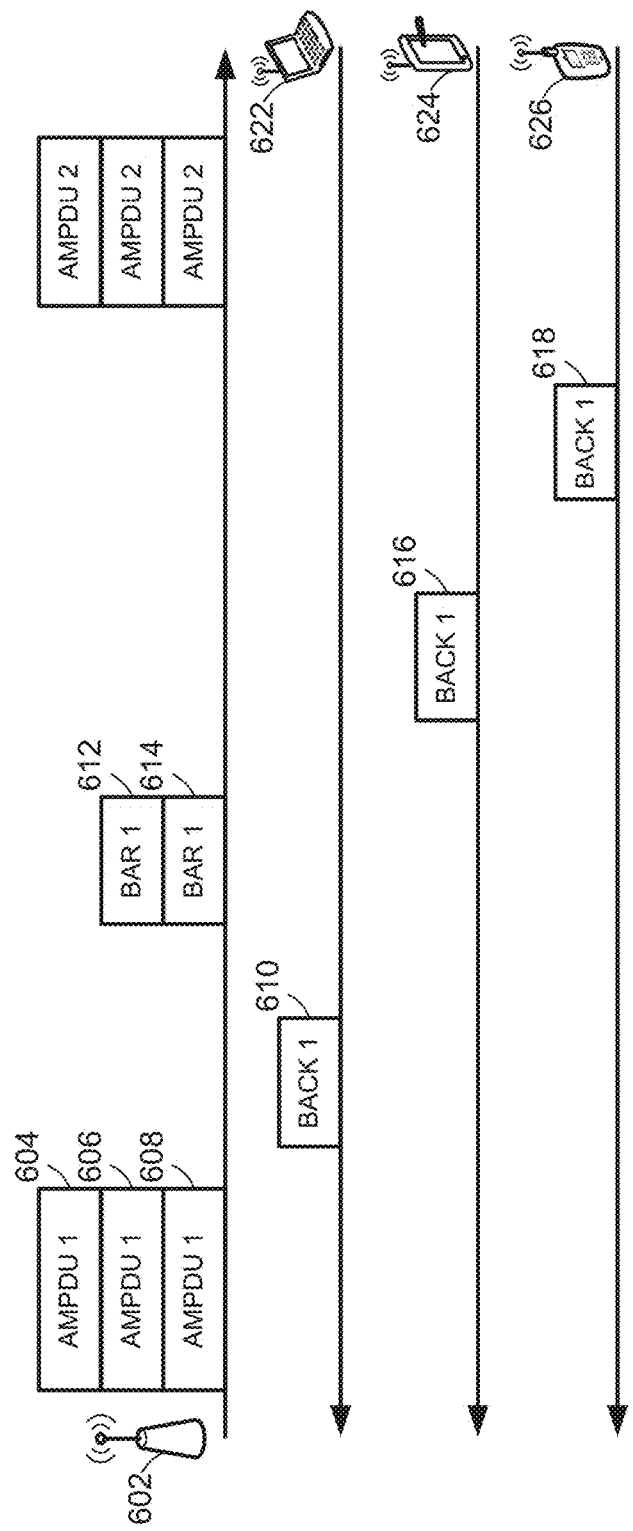
FIG. 6 depicts an illustrative schematic diagram for reverse direction MU-MIMO, in accordance with one or more example embodiments of the present disclosure.

FIG. 6 depicts an illustrative schematic diagram for an MU-MIMO group communications without RD data.

Referring to FIG. 6, there is shown another example with three user devices (e.g., user devices 622, 624, and 626) and an AP (e.g., AP 602) in an MU-MIMO group. The AP 602 may send one MU PPDU (e.g., AMPDU 604) with ACK policy set to 00 (meaning immediate response with a BACK frame) for user device 622, and may send two more MU PPDU (e.g., AMPDU 606 and 608) with ACK policy set to 11 for user devices 624 and 626. An ACK policy value of 00 may indicate immediate block acknowledgment (BACK). An ACK policy value of 11 may indicate that the device receiving this indication, should wait before sending its BACK until the RD initiator sends it the BAR. The user device 622 may send its block acknowledgment (e.g., BACK 610) after the passage of an SIFS time after receiving the AMPDU 604. The AP 602 may then send BAR 612 and 614 to user devices 624 and 626 respectively in MU-MIMO fashion. The user devices 624 and 626 may then reply with their block acknowledgments (e.g., BACK 616 and 618) sequentially according to the order indicated in the BAR 612 and 614. It is understood that the above descriptions are for purposes of illustration and are not meant to be limiting.

Figure 7A:
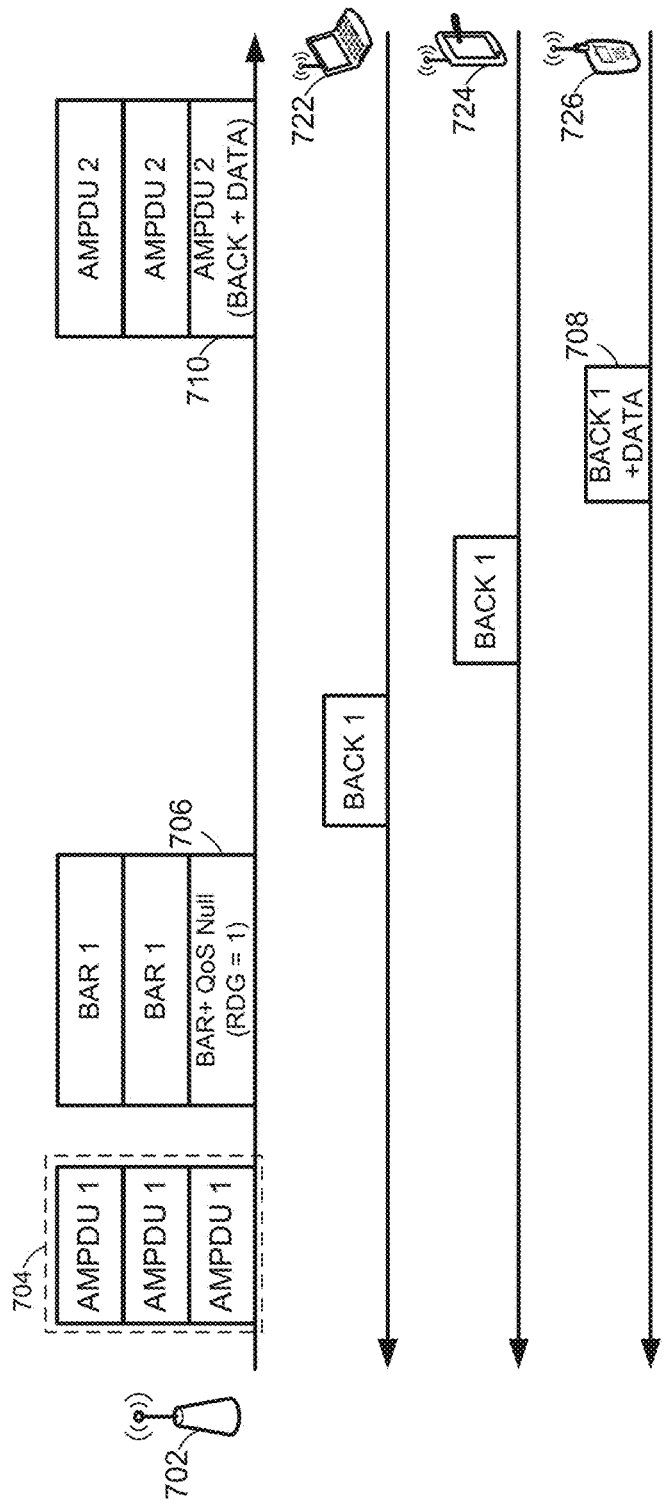
FIGS. 7A-7B depict illustrative schematic diagrams of a reverse direction MU-MIMO system, in accordance with one or more example embodiments of the present disclosure.
Figure 7B:
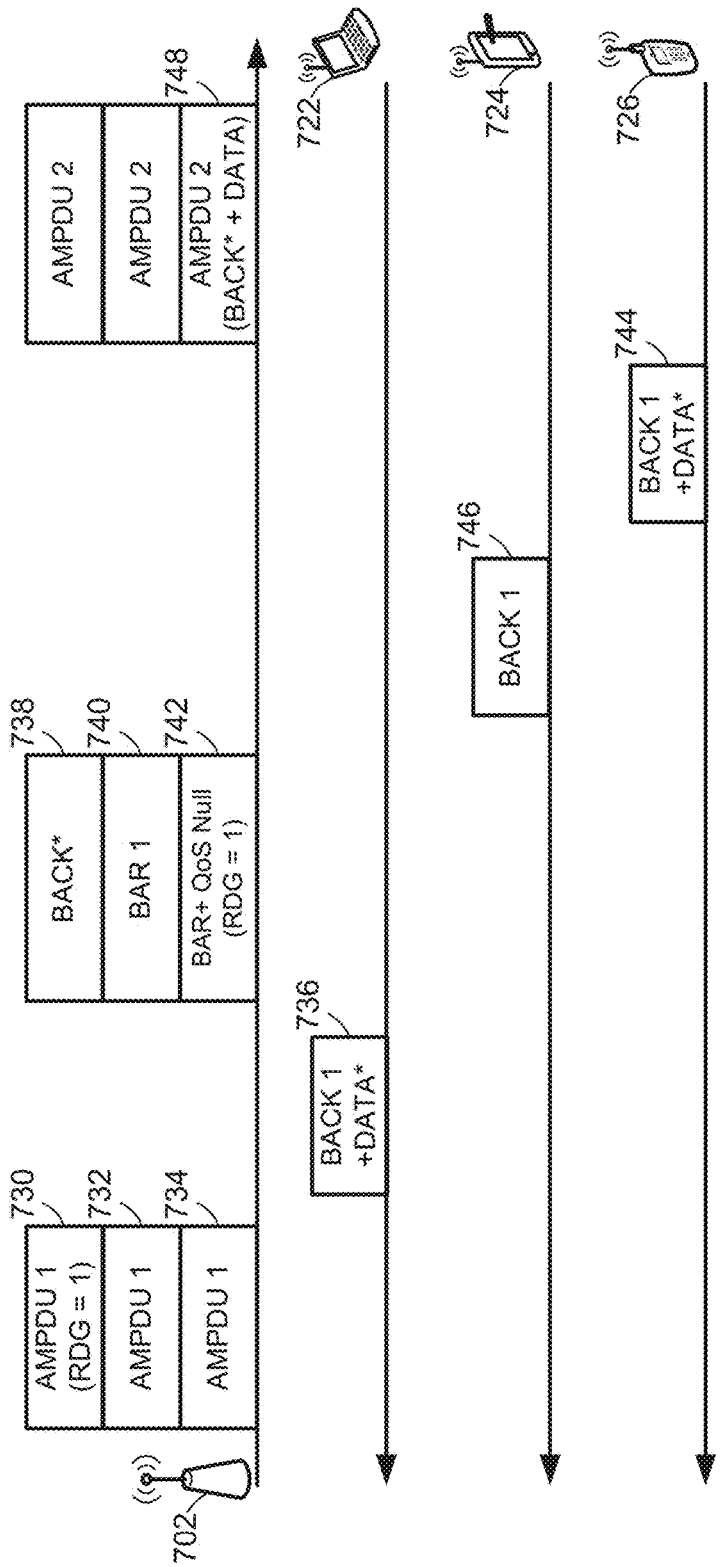

FIGS. 7A-7B depict illustrative schematic diagrams for RD MU-MIMO system, in accordance with one or more example embodiments of the present disclosure.

FIGS. 7A-7B show two examples of an RD MU-MIMO systems that may be configured to enable RD for an MU-MIMO group. It should be noted that any standalone BACK frames sent from the RD initiator device to any of the RD responder devices is not shown in FIGS. 7A-7B. It should be noted that actions taken by the AP may also be taken by the PCP. However, for ease of use, references are made to the actions of the AP.

Referring to FIG. 7A, an RD MU-MIMO system may facilitate an RD initiator device (e.g., AP 702 (or PCP)) to set the ACK Policy=11 in each MU PPDU (e.g., MU PPDUs 704) associated with in the MU-MIMO group that includes AP 702 and user devices 722, 724, and 726. Setting the ACK policy to 11 means that every MU STAs (e.g., user devices 722, 724, and 726) need to wait for the BAR in order to send its BACK.

In this example, the last MU MIMO STA (e.g., user device 726) may be enabled to send its data in the reverse direction if enabled by the initiator device (e.g., AP 702). This is because otherwise, if there are any other MU MIMO STAs (e.g., user devices 722 and 724) that are required to send their BACK frames to the RD initiator would not know if a previous RD responder has finished sending its data. It should be noted that only the STA that is granted RD is called an RD responder. In this example, only 726 is an RD responder. Only the RD responder may be able to send its RD data without affecting any previous RD responders. The duration/ID field of the MU PPDU to this RD responder (e.g., user device 726) may be set to indicate the time allowed for the RD respond burst and any response if required. In order for the AP 702 to enable the user device 726 to send its RD data back to the AP 702, the AP 702 may set RDG=1 in the QoS_Null frame and aggregate it with a BAR frame 706 for user device 726 that is the last to respond with its acknowledgment (e.g., frame 708) for the current MU PPDU. The RD responder (e.g., user device 726) that is granted RD in MU PPDU may start sending its RD data aggregated with a BACK frame (e.g., frame 708) after the passage of a SIFS time after receiving the RD grant (e.g., RDG=1). The RD responder that is granted RD in BAR does not start send the frame 708 until its allocated time slot to send its acknowledgment frame.

After the passage of a SIFS time after receiving the frame 708, the AP 702 may send an acknowledgment (e.g., frame 710) if required by the RD responder (e.g., user device 726).

The frame 710 may be sent by one or more mechanism. For example, it may be sent to the user device 726 together with BAR frames to other RD responders in the MU-MIMO group in MU-MIMO fashion. In another example, a standalone frame 710 may be sent to the user device 726, followed by BAR in MU-MIMO fashion to the other RD responders (e.g., user devices 722, and 724) in the MU-MIMO group. In another example, the frame 710 may be aggregated with DATA that the AP 702 may want to send to the user device 726, where the frame 710 may be sent as the next MU PPDU to the user device 726. It is understood that the above descriptions are for purposes of illustration and are not meant to be limiting.

Referring to FIG. 7B, the AP 702 may send one MU PPDU (e.g., AMPDU 730) with ACK policy set to 00 (meaning immediate response with a BACK frame) for user device 722 in order to enable the user device 722 to send its BACK frame immediately after receiving the AMPDU 730, and acknowledging receiving the AMPDU 730. Further, the AP 702 may set the RDG=1, indicating to the user device 722 that it is enabled to send its data back to the AP 702 within the same TXOP of the AP 702. The AP 702 may send two more MU PPDU (e.g., AMPDU 732 and 734) with ACK policy set to 11 for user devices 724 and 726 in a MU-MIMO fashion (e.g., simultaneously). An ACK policy value of 00 may indicate immediate block acknowledgment (BACK). An ACK policy value of 11 may indicate that the device receiving this indication, should wait before sending its BACK until the RD initiator sends it the BAR. The user device 722 may send a frame that may be an aggregation of an acknowledgment frame and RD data (e.g., frame 736) after the passage of an SIFS time after receiving the AMPDU 730. The AP 702 may respond to the frame 736 received from user device 722 if required by the user device 722 by sending a BACK frame 738. In addition, the AP 702 may send two BAR frames (e.g., frames, 740 and 742) to the remaining two RD responders (e.g., user devices 724 and 726). However, as the example of FIG. 7A, the AP 702 may only enable the last RD responder (e.g., user device 726) to send its data aggregated with a BACK frame (e.g., frame 746).

Only the last MU MIMO STA that is polled by the AP (e.g., user device 726) may be able to send its RD data without affecting any previous RD responders (e.g., user devices 722 and 724). The duration/ID field of the MU PPDU to this RD responder (e.g., user device 726) may be set to indicate the time allowed for the RD respond burst and any response if required. In order for the AP 702 to enable the user device 726 to send its RD data back to the AP 702, the AP 702 may set RDG=1 in the QoS_Null frame and aggregate it with a BAR frame 742 for user device 726 that is the last to respond with its block acknowledgment (e.g., frame 744) for the current MU PPDU (e.g., AMPDU 734). The RD responder (e.g., user device 726) that is granted RD in MU PPDU may start sending its RD data aggregated with a BACK frame (e.g., frame 708) after the passage of a SIFS time after receiving the RD grant (e.g., RDG=1). The RD responder that is granted RD in BAR does not start send the frame 744 until its allocated time slot to send its block acknowledgment. After the passage of a SIFS time after receiving the frame 744, the AP 702 my send an acknowledgment (e.g., frame 748) if required by the RD responder (e.g., user device 726).

The frame 748 may be sent by one or more mechanism. For example, it may be sent to the user device 726 together with BAR frames to other RD responders in the MU-MIMO group in an MU-MIMO fashion. In another example, a standalone frame 748 may be sent to the user device 726, followed by BAR in MU-MIMO fashion to the other RD responders (e.g., user devices 722, and 724) in the MU-MIMO group. In another example, the frame 748 may be aggregated with DATA that the AP 702 may want to send to the user device 726, where the frame 748 may be sent as the next MU PPDU to the user device 726. It should be noted that since user device 724 was not enabled to send any reverse direction data, the user device 724 may respond with an acknowledgment (e.g., frame 746), as indicated in the BAR frame 740. It is understood that the above descriptions are for purposes of illustration and are not meant to be limiting.

Figure 8A:
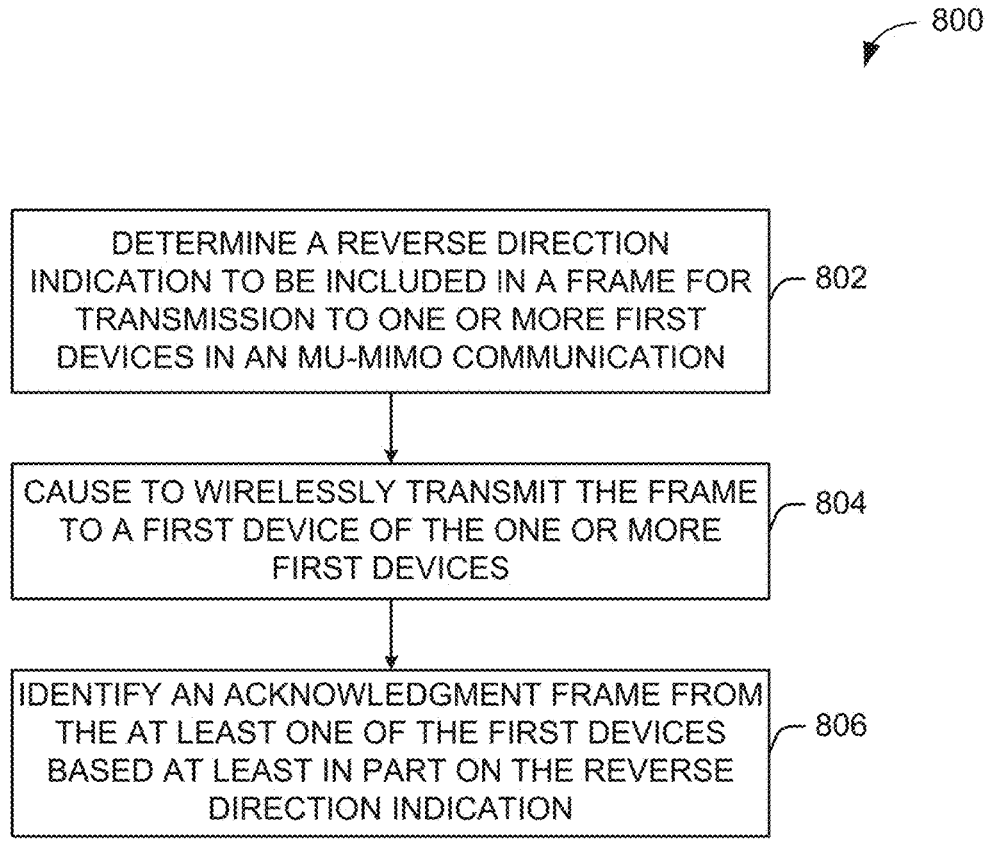
FIG. 8A depicts a flow diagram of an illustrative process for reverse direction MU-MIMO, in accordance with one or more example embodiments of the present disclosure.

FIG. 8A illustrates a flow diagram of illustrative process 800 for reverse direction MU-MIMO, in accordance with one or more example embodiments of the present disclosure.

It should be noted that actions taken by the AP may also be taken by the PCP. However, for ease of use, references are made to the actions of the AP.

At block 802, a device (e.g., the user device(s) 120 and/or the AP 102 of FIG. 1) may determine a reverse direction indication to be included in a frame for transmission to one or more first devices in a MU-MIMO communication. For example, when an AP/PCP sends one or more frames (e.g., AMPDU or an acknowledgment request frame) to one or more devices pursuant to MU-MIMO, the AP/PCP encode or otherwise include a reverse direction indication in at least one of the one or more frames. The AP/PCP may determine a transmit opportunity (TXOP) allocated to the AP/PCP. The AP/PCP may want to notify a user device that the user device can send reverse direction data within the TXOP that is allocated for the AP/PCP. The AP/PCP may determine the reverse direction indication by setting a reverse direction grant field (e.g., RDG=1) to indicate that reverse direction is granted. In some examples, the AP/PCP may determine the reverse direction indication by setting a reverse direction field in a quality of service frame (QoS_Null frame). A null frame is a frame meant to contain no data but flag certain information. A QoS_Null frame is the QoS version of the null frame. The AP/PCP may aggregate the quality of service frame with an acknowledgment request frame before transmitting the aggregate frame to the user device.

At block 804, the device may cause to wirelessly transmit the frame to a first device of the one or more first devices. For example, the AP/PCP may send a frame, such as an MU PPDU frame or a block acknowledgment request frame that contain the reverse direction indication. When the user device received that reverse direction indication, the user device may then send back an acknowledgment to the MU PPDU and then attach or otherwise aggregate any data that the user device would like to send back to the AP/PCP. For example, the user device may aggregate its acknowledgment with any data that it wants to send the AP/PCP in the reverse direction.

At block 806, the device may identify an acknowledgment frame from the at least one of the first devices based at least in part on the reverse direction indication. For example, the AP/PCP may receive the user device's aggregated acknowledgment with reverse direction data. Based on that, the user device may have indicated in the aggregated frame that it requires an acknowledgement from the AP/PCP when the AP/PCP receives the aggregated frame. In that case, the AP/PCP may respond with an acknowledgement.

It is understood that the above descriptions are for purposes of illustration and are not meant to be limiting.

Figure 8B:
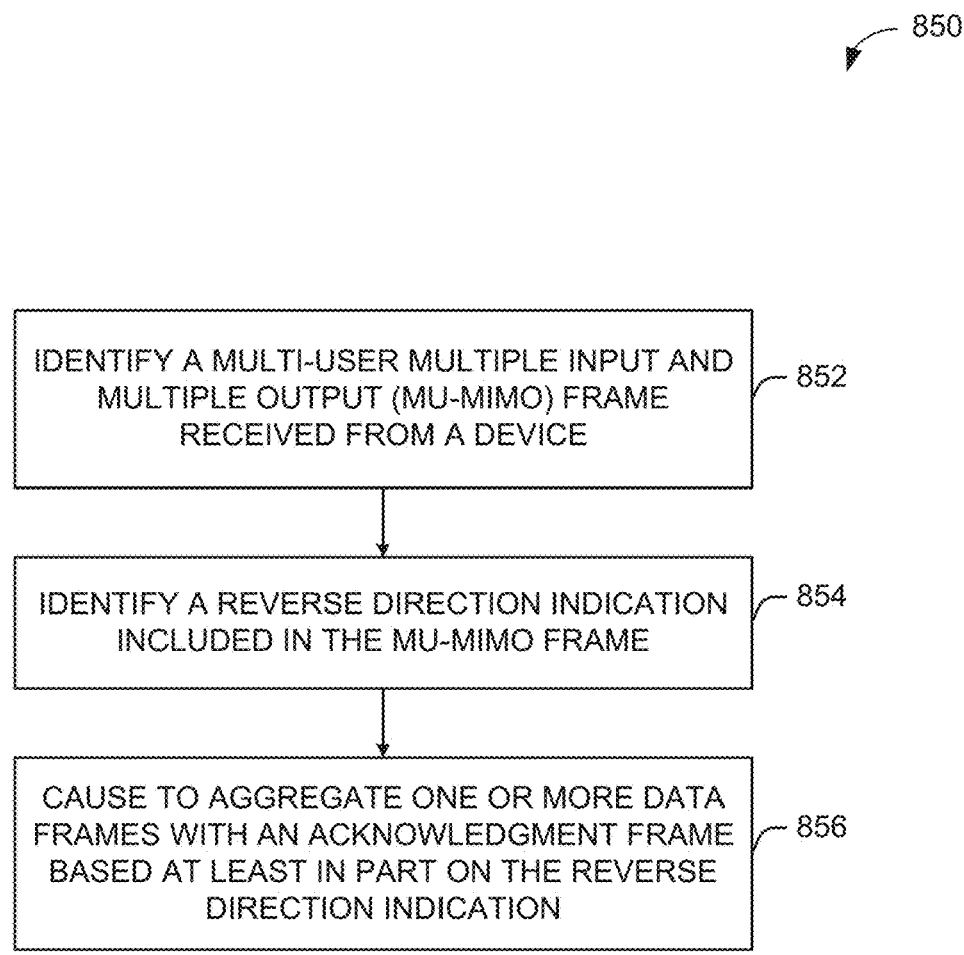
FIG. 8B depicts a flow diagram of an illustrative process for reverse direction MU-MIMO, in accordance with one or more example embodiments of the present disclosure.

FIG. 8B illustrates a flow diagram of illustrative process 850 for reverse direction MU-MIMO, in accordance with one or more example embodiments of the present disclosure. It should be noted that actions taken by the AP may also be taken by the PCP. However, for ease of use, references are made to the actions of the AP.

At block 852, a device (e.g., the user device(s) 120 and/or the AP 102 of FIG. 1) may identify a MU-MIMO frame received from another device (e.g., the user device(s) 120 and/or the AP 102 of FIG. 1). For example, a user device may receive an MU-MIMO frame from an AP, where the user device, the AP, and other user devices may be part of an MU-MIMO group. The MU-MIMO frame may be an enhanced directional multi-gigabit (EDMG) frame. The MU-MIMO frame includes an order indicating to the device a time slot to send its acknowledgment frame At block 854, the device may identify a reverse direction indication included in the MU-MIMO frame. The AP may determine a transmit opportunity (TXOP) allocated to it and may want to notify a user device that the user device is enabled to send reverse direction data within the TXOP that is allocated for the AP. The indication may be included in a MU PPDU frame or a block acknowledgment request frame. The AP may determine the reverse direction indication by setting a reverse direction field (e.g., an RDG=1) in a quality of service frame (QoS_Null frame). A null frame is a frame meant to contain no data but flag certain information. A QoS_Null frame is the QoS version of the null frame. The user device may identify that the received MU-MIMO frame is an aggregate of a quality of service frame with an acknowledgment request frame (e.g., a BAR frame). Since a BAR frame does not include an RDG field in its header, in order to carry an RDG field, an AP may need to aggregate a BAR frame with a QoS-Null frame, which has an RDG field in its header, to form an MU-MIMO frame (e.g., AMPDU frame).

At block 856, the device may cause to aggregate one or more data frames with an acknowledgement frame based at least in part on the reverse direction indication.

The user device that is granted RD may start to transmit its reverse direction data after the passage of a SIFS time after receiving the RD grant (e.g., RDG=1). That is the user device may send a frame which may be in aggregated acknowledgement (e.g., BACK or ACK frames) and any reverse direction data that the user device wants to communicate to the AP. It is understood that the above descriptions are for purposes of illustration and are not meant to be limiting.

FIG. 9 shows a functional diagram of an exemplary communication station 900 in accordance with some embodiments. In one embodiment, FIG. 9 illustrates a functional block diagram of a communication station that may be suitable for use as an AP 102 (FIG. 1) or a user device 120 (FIG. 1) in accordance with some embodiments. The communication station 900 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 900 may include communications circuitry 902 and a transceiver 910 for transmitting and receiving signals to and from other communication stations using one or more antennas 901. The communications circuitry 902 may include circuitry that can operate the physical layer (PHY) communications and/or media access control (MAC) communications for controlling access to the wireless medium, and/or any other communications layers for transmitting and receiving signals. The communication station 900 may also include processing circuitry 906 and memory 908 arranged to perform the operations described herein. In some embodiments, the communications circuitry 902 and the processing circuitry 906 may be configured to perform operations detailed in FIGS. 2-8.

In accordance with some embodiments, the communications circuitry 902 may be arranged to contend for a wireless medium and configure frames or packets for communicating over the wireless medium. The communications circuitry 902 may be arranged to transmit and receive signals. The communications circuitry 902 may also include circuitry for modulation/demodulation, upconversion/downconversion, filtering, amplification, etc. In some embodiments, the processing circuitry 906 of the communication station 900 may include one or more processors. In other embodiments, two or more antennas 901 may be coupled to the communications circuitry 902 arranged for sending and receiving signals. The memory 908 may store information for configuring the processing circuitry 906 to perform operations for configuring and transmitting message frames and performing the various operations described herein. The memory 908 may include any type of memory, including non-transitory memory, for storing information in a form readable by a machine (e.g., a computer). For example, the memory 908 may include a computer-readable storage device, read-only memory (ROM), random-access memory (RAM), magnetic disk storage media, optical storage media, flash-memory devices and other storage devices and media.

In some embodiments, the communication station 900 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 900 may include one or more antennas 901. The antennas 901 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 900 may include one or more of a keyboard, a display, a non-volatile memory port, multiple antennas, a graphics processor, an application processor, speakers, and other mobile device elements. The display may be an LCD screen including a touch screen.

Although the communication station 900 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 900 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 900 may include one or more processors and may be configured with instructions stored on a computer-readable storage device memory.

FIG. 10 illustrates a block diagram of an example of a machine 1000 or system upon which any one or more of the techniques (e.g., methodologies) discussed herein may be performed. In other embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environments. The machine 1000 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a power management device 1032, a graphics display device 1010, an alphanumeric input device 1012 (e.g., a keyboard), and a user interface (UI) navigation device 1014 (e.g., a mouse). In an example, the graphics display device 1010, alphanumeric input device 1012, and UI navigation device 1014 may be a touch screen display. The machine 1000 may additionally include a storage device (i.e., drive unit) 1016, a signal generation device 1018 (e.g., a speaker), a reverse direction MU-MIMO device 1019, a network interface device/transceiver 1020 coupled to antenna(s) 1030, and one or more sensors 1028, such as a global positioning system (GPS) sensor, a compass, an accelerometer, or other sensor. The machine 1000 may include an output controller 1034, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

The reverse direction MU-MIMO device 1019 may carry out or perform any of the operations and processes (e.g., processes 800 and 850) described and shown above. For example, the reverse direction MU-MIMO device 1019 may be configured to support RD for DL MU-MIMO transmissions. An RD MU-MIMO protocol may allow bi-directional communication between two or more devices during a transmit opportunity (TXOP) period by eliminating the need for either device to initiate a new data transfer. For example, during communications between an initiating device, such as an AP, and multiple responding devices (e.g., STAs), the multiple responding devices would be able to utilize the RD MU-MIMO system and send their data to the initiating device without having to go through channel access delay using, for example, a backoff timer to stay away from the channel while the channel is still busy. Without the RD MU-MIMO protocol, each unidirectional data transfer required each responding device to follow channel access delays in order to send its UL data. With RD, once the initiating device has obtained a TXOP, it may grant permission to the other devices to send information back during the initiating device's TXOP period. In this type of communication, two roles for each of the devices may be defined, an RD initiator and an RD responder. The RD initiator may send its permission to the RD responder to send its data in the reverse direction using, for example, a reverse direction grant (RDG). The RD responder may signal whether or not it will be sending data in the reverse direction.

The reverse direction MU-MIMO device 1019 may use MU-MIMO to deliver data from an RD initiator (e.g., an AP) to multiple RD responders (e.g., STAs), where an RDG may be signaled by the RD initiator to each of the RD responders. For example, the RD MU-MIMO system may utilize one or more MU PPDUs that are addressed to the RD responders in order to signal to the RD responders using RDG that at least one of the RD responders is authorized to transmit data in the uplink direction during the same TXOP of the RD initiator.

The reverse direction MU-MIMO device 1019 may utilize a block acknowledgment request frame that may be aggregated with a quality of service (QoS) frame (e.g., QoS-Null frame) in order to signal to the RD responders using RDG that at least one of the RD responders is authorized to transmit data in the uplink direction during the same TXOP of the RD initiator.

In one embodiment, the RD MU-MIMO system may utilize a block acknowledgment (BA) in order to respond to the RD initiator and in some cases to aggregate or otherwise piggyback RD data to the BA. If the RD data traffic sent from the RD responder to the RD initiator requires a response, the RD initiator may send BA to the RD responder.

The reverse direction MU-MIMO device 1019 may send a response to an RD responder that may have sent RD data to an RD initiator using a BA address to the RD responder, in addition or simultaneously with a BAR designated for another RD responder in and MU-MIMO fashion (e.g., when the RD initiator is simultaneously communicating with multiple RD responders).

The reverse direction MU-MIMO device 1019 may send a standalone BA to the RD responder, which may then be followed by a BAR to another RD responder. The RD MU-MIMO system may, in this case be sequentially sending the standalone BA and the BAR to two RD responders.

The reverse direction MU-MIMO device 1019 may piggyback the BA to the RD responder in the next MU PPDU that the RD initiator will send to the RD responder within the TXOP.

The reverse direction MU-MIMO device 1019 may indicate the order in which each RD responder in the MU-MIMO communication with the RD initiator should send its BA.

The reverse direction MU-MIMO device 1019 may indicate in one of its and MU PPDU sent to a first RD responder from multiple RD responders involved in the MU-MIMO communication with the RD initiator, where the acknowledgment (ACK) policy is set to indicate for the first RD responder that it is to immediately send a BA when it receives its and MU PPDU. An ACK policy value of 00 may indicate immediate block acknowledgment. The RD initiator set the ACK policy to indicate to the rest of the RD responders that they should wait until they receive their corresponding BAR from the RD initiator. An ACK policy value of 11 may indicate that the device receiving this indication, should wait until the RD initiator sends it a BAR.

It is understood that the above are only a subset of what the reverse direction MU-MIMO device 1019 may be configured to perform and that other functions included throughout this disclosure may also be performed by the reverse direction MU-MIMO device 1019.

While the machine-readable medium 1022 is illustrated as a single medium, the term "machine-readable medium" may include a single medium or multiple media (e.g., a centralized or distributed database, and/or associated caches and servers) configured to store the one or more instructions 1024.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1000 and that cause the machine 1000 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device/transceiver 1020 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1020 may include one or more physical jacks (e.g., Ethernet, coaxial, or phone jacks) or one or more antennas to connect to the communications network 1026. In an example, the network interface device/transceiver 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1000 and includes digital or analog communications signals or other intangible media to facilitate communication of such software. The operations and processes (e.g., processes 500 and 550) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

According to example embodiments of the disclosure, there may be a device. The device may include memory and processing circuitry configured to determine a reverse direction indication to be included in a frame for transmission to one or more first devices in a multi-user multiple input multiple output (MU-MIMO) communication. The memory and processing circuitry may be further configured to cause to wirelessly transmit the frame to a first device of the one or more first devices. The memory and processing circuitry may be further configured to identify an acknowledgment frame received from the first devices, wherein the acknowledgement frame may include at least in part an indication of one or more aggregated data frames.

The implementations may include one or more of the following features. The frame comprises an MU-MIMO media access control protocol data unit (MPDU) frame or an acknowledgment request frame. The frame may include at least in part an order at which the one or more first devices are to send their respective acknowledgment frames. The memory and the processing circuitry may be further configured to determine the reverse direction indication by setting a reverse direction field in a quality of service frame. The memory and processing circuitry may be further configured to aggregate the quality of service frame with an acknowledgment request frame. The memory and processing circuitry may be further configured to cause to wirelessly transmit the aggregated quality of service frame and the acknowledgment request frame to a second device of the one or more first devices. The aggregated quality of service frame and the acknowledgment request frame are wirelessly transmitted to the second device using the MU-MIMO communication. The aggregated quality of service frame and the acknowledgment request frame are wirelessly transmitted to the second device sequentially with the acknowledgment frame sent to the first device. The memory and the processing circuitry may be further configured to determine the reverse direction indication by setting a reverse direction grant field to indicate that reverse direction is granted. The memory and the processing circuitry may be further configured to determine a transmit opportunity (TXOP) allocated to the device. The device may further include a transceiver configured to transmit and receive wireless signals. The device may further include one or more antennas coupled to the transceiver.

According to example embodiments of the disclosure, there may be a device. The device may include memory and processing circuitry configured to identify a multi-user multiple input multiple output (MU-MIMO) frame received from a device. The memory and processing circuitry may be further configured to identify a reverse direction indication included in the MU-MIMO frame. The memory and processing circuitry may be further configured to cause to aggregate one or more data frames with an acknowledgment frame based at least in part on the reverse direction indication. The memory and processing circuitry may be further configured to determine if there are additional data frames to be sent.

The memory and processing circuitry may be further configured to cause to send the additional data frames with or without aggregation based at least in part on the reverse direction indication.

The implementations may include one or more of the following features. The MU-MIMO frame is an enhanced directional multi-gigabit (EDMG) frame. The MU-MIMO frame may include an order indicating to the device a time slot to send its acknowledgment frame. The memory and the processing circuitry may be further configured to cause to send the aggregated one or more data frames with the acknowledgment frame to the device during a transmit opportunity (TXOP) allocated to the device. The reverse direction indication is included in an MU-MIMO media access control protocol data unit (MPDU) frame or an acknowledgment request frame aggregated with a quality of service frame.

According to example embodiments of the disclosure, there may be a non-transitory computer-readable medium storing computer-executable instructions which, when executed by a processor, cause the processor to perform operations. The operations may include identifying a multi-user multiple input multiple output (MU-MIMO) frame received from a device. The operations may include identifying a reverse direction indication included in the MU-MIMO frame. The operations may include causing to aggregate one or more data frames with an acknowledgment frame based at least in part on the reverse direction indication. The operations may include determining if there are additional data frames to be sent. The operations may include causing to send the additional data frames with or without aggregation based at least in part on the reverse direction indication.

The implementations may include one or more of the following features. The MU-MIMO frame is an enhanced directional multi-gigabit (EDMG) frame. The MU-MIMO frame may include an order indicating to the device a time slot to send its acknowledgment frame. The operations further may include causing to send the aggregated one or more data frames with the acknowledgment frame to the device during a transmit opportunity (TXOP) allocated to the device. The reverse direction indication is included in an MU-MIMO media access control protocol data unit (MPDU) frame or an acknowledgment request frame aggregated with a quality of service frame.

According to example embodiments of the disclosure, there may be a non-transitory computer-readable medium storing computer-executable instructions which, when executed by a processor, cause the processor to perform operations. The operations may include determining, by one or more processors, a reverse direction indication to be included in a frame for transmission to one or more devices in a multi-user multiple input multiple output (MU-MIMO) communication. The operations may include causing to wirelessly transmit the frame to a device of the one or more devices. The operations may include identifying an acknowledgment frame received from the one or more devices, wherein the acknowledgement frame may include at least in part an indication of one or more aggregated data frames.

The implementations may include one or more of the following features. The frame comprises an MU-MIMO media access control protocol data unit (MPDU) frame or an acknowledgment request frame. The frame may include at least in part an order at which the one or more first devices are to send their respective acknowledgment frames. The operations may further include determining the reverse direction indication by setting a reverse direction field in a quality of service frame. The operations may further include aggregating the quality of service frame with an acknowledgment request frame. The operations may include causing to wirelessly transmit the aggregated quality of service frame and the acknowledgment request frame to a second device of the one or more first devices. The aggregated quality of service frame and the acknowledgment request frame are wirelessly transmitted to the second device using the MU-MIMO communication. The aggregated quality of service frame and the acknowledgment request frame are wirelessly transmitted to the second device sequentially with the acknowledgment frame sent to the first device. The operations may further include determining the reverse direction indication by setting a reverse direction grant field to indicate that reverse direction is granted. The operations may further include determining a transmit opportunity (TXOP) allocated to the device.

In example embodiments of the disclosure, there may be an apparatus. The apparatus may include means for determining, by one or more processors, a reverse direction indication to be included in a frame for transmission to one or more devices in a multi-user multiple input multiple output (MU-MIMO) communication. The apparatus may include means for causing to wirelessly transmit the frame to a device of the one or more devices. The apparatus may include means for identifying an acknowledgment frame received from the one or more devices, wherein the acknowledgement frame includes at least in part an indication of one or more aggregated data frames.

The implementations may include one or more of the following features. The frame may include an MU-MIMO media access control protocol data unit (MPDU) frame or an acknowledgment request frame. The apparatus may include, at least in part, an order at which the one or more first devices are to send their respective acknowledgment frames. The apparatus may further include means for determining the reverse direction indication by setting a reverse direction field in a quality of service frame.

The apparatus may further include means for aggregating the quality of service frame with an acknowledgment request frame. The apparatus may further include means for causing to wirelessly transmit the aggregated quality of service frame and the acknowledgment request frame to a second device of the one or more first devices. The aggregated quality of service frame and the acknowledgment request frame are wirelessly transmitted to the second device using the MU-MIMO communication. The aggregated quality of service frame and the acknowledgment request frame are wirelessly transmitted to the second device sequentially with the acknowledgment frame sent to the first device. The apparatus may further include means for determining the reverse direction indication by setting a reverse direction grant field to indicate that reverse direction is granted. The apparatus may further include means for determining a transmit opportunity (TXOP) allocated to the device.

In example embodiments of the disclosure, there may be an apparatus. The apparatus may include means for identifying a multi-user multiple input multiple output (MU-MIMO) frame received from a device. The apparatus may include means for identifying a reverse direction indication included in the MU-MIMO frame. The apparatus may include means for causing to aggregate one or more data frames with an acknowledgment frame based at least in part on the reverse direction indication. The apparatus may include means for determining if there are additional data frames to be sent. The apparatus may include means for causing to send the additional data frames with or without aggregation based at least in part on the reverse direction indication.

The implementations may include one or more of the following features. The MU-MIMO frame is an enhanced directional multi-gigabit (EDMG) frame. The MU-MIMO frame includes an order indicating to the device a time slot to send its acknowledgment frame. The apparatus may further include means for causing to send the aggregated one or more data frames with the acknowledgment frame to the device during a transmit opportunity (TXOP) allocated to the device. The reverse direction indication is included in an MU-MIMO media access control protocol data unit (MPDU) frame or an acknowledgment request frame aggregated with a quality of service frame. The index is comprised of one or more bits having most significant bits (MSBs) and least significant bits (LSBs). An apparatus may include means for performing a method as claimed in any of the preceding claims.

According to example embodiments of the disclosure, there may include a method. The method may include determining, by one or more processors, a reverse direction indication to be included in a frame for transmission to one or more devices in a multi-user multiple input multiple output (MU-MIMO) communication. The method may include causing to wirelessly transmit the frame to a device of the one or more devices. The method may include identifying an acknowledgment frame received from the one or more devices, wherein the acknowledgement frame includes at least in part an indication of one or more aggregated data frames.

The implementations may include one or more of the following features. The frame comprises an MU-MIMO media access control protocol data unit (MPDU) frame or an acknowledgment request frame. The frame includes at least in part an order at which the one or more first devices are to send their respective acknowledgment frames. The method may further include determining the reverse direction indication by setting a reverse direction field in a quality of service frame. The method may further include aggregating the quality of service frame with an acknowledgment request frame. The method may include causing to wirelessly transmit the aggregated quality of service frame and the acknowledgment request frame to a second device of the one or more first devices. The aggregated quality of service frame and the acknowledgment request frame are wirelessly transmitted to the second device using the MU-MIMO communication. The aggregated quality of service frame and the acknowledgment request frame are wirelessly transmitted to the second device sequentially with the acknowledgment frame sent to the first device. The method may further include determining the reverse direction indication by setting a reverse direction grant field to indicate that reverse direction is granted. The method may further include determining a transmit opportunity (TXOP) allocated to the device.

According to example embodiments of the disclosure, there may include a method. The method may include identifying a multi-user multiple input multiple output (MU-MIMO) frame received from a device. The method may include identifying a reverse direction indication included in the MU-MIMO frame. The method may include causing to aggregate one or more data frames with an acknowledgment frame based at least in part on the reverse direction indication. The method may include determining if there are additional data frames to be sent. The method may include causing to send the additional data frames with or without aggregation based at least in part on the reverse direction indication.

The implementations may include one or more of the following features. The MU-MIMO frame is an enhanced directional multi-gigabit (EDMG) frame. The MU-MIMO frame includes an order indicating to the device a time slot to send its acknowledgment frame. The method may further include causing to send the aggregated one or more data frames with the acknowledgment frame to the device during a transmit opportunity (TXOP) allocated to the device. The reverse direction indication is included in an MU-MIMO media access control protocol data unit (MPDU) frame or an acknowledgment request frame aggregated with a quality of service frame.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising a memory and a processing circuitry configured to:
   determine a first reverse direction indication to be included in a frame for transmission to one or more devices in a multi-user multiple input multiple output (MU-MIMO) communication;
   cause to wirelessly transmit the frame to a first device of the one or more devices; identify an acknowledgment frame received from the first device, wherein the acknowledgement frame includes at least in part an indication of one or more aggregated data frames;
   aggregate a quality of service (QoS) Null Frame with an acknowledgment request frame to generate an aggregated frame, wherein a second reverse direction is included in the QoS Null Frame to indicate that a second station device is permitted to send uplink data; and
   cause to send the aggregated frame to a second device of the one or more devices.

2. The device of claim 1, wherein the frame comprises an MU-MIMO media access control protocol data unit (MPDU) frame or an acknowledgment request frame.

3. The device of claim 1, wherein the frame includes at least in part an order at which the one or more devices are to send their respective acknowledgment frames.

4. The device of claim 1, wherein the memory and the processing circuitry are further configured to determine the first reverse direction indication by setting a reverse direction field in a quality of service frame.

5. The device of claim 4, wherein the aggregated quality of service QoS Null frame and the acknowledgment request frame are wirelessly transmitted to the second device using the MU-MIMO communication.

6. The device of claim 4, wherein the aggregated quality of service QoS Null frame and the acknowledgment request frame are wirelessly transmitted to the second device sequentially with the acknowledgment frame sent to the first device.

7. The device of claim 1, wherein the memory and the processing circuitry are further configured to determine the first reverse direction indication by setting a reverse direction grant field to indicate that reverse direction is granted.

8. The device of claim 1, wherein the memory and the processing circuitry are further configured to determine a transmit opportunity (TXOP) allocated to the device.

9. The device of claim 1, further comprising a transceiver configured to transmit and receive wireless signals.

10. The device of claim 9, further comprising one or more antennas coupled to the transceiver.

11. A non-transitory computer-readable medium storing computer-executable instructions which when executed by one or more processors result in performing operations comprising:
    identifying an aggregated frame received from a device, wherein the aggregated frame is an aggregation of a QoS null frame with a block acknowledgment request (BAR), wherein a first reverse direction is included in the QoS null frame to indicate a permission to send uplink data;
    causing to aggregate one or more data frames with an acknowledgment frame based at least in part on the first reverse direction indication;
    determining one or more additional data frames to be sent; and
    causing to send the one or more additional data frames with aggregation based at least in part on a second reverse direction indication.

12. The non-transitory computer-readable medium of claim 11, wherein the aggregated frame is an enhanced directional multi-gigabit (EDMG) frame.

13. The non-transitory computer-readable medium of claim 11, wherein the operations further comprising causing to send the aggregated one or more data frames with the acknowledgment frame to the device during a transmit opportunity (TXOP) allocated to the device.

14. The non-transitory computer-readable medium of claim 11, wherein the second reverse direction indication is included in an MU-MIMO media access control protocol data unit (MPDU) frame or an acknowledgment request frame aggregated with a quality of service frame.

15. A method comprising:
    determining, by one or more processors, a first reverse direction indication to be included in a frame for transmission to one or more devices in a multi-user multiple input multiple output (MU-MIMO) communication;
    causing to wirelessly transmit the frame to a first device of the one or more devices; and identifying an acknowledgment frame received from the first device, wherein the acknowledgement frame includes at least in part an indication of one or more aggregated data frames;
    aggregating a quality of service (QoS) Null Frame with an acknowledgment request frame to generate an aggregated frame, wherein a second reverse direction is included in the QoS Null Frame to indicate that a second station device is permitted to send uplink data; and causing to send the aggregated frame to a second device of the one or more devices.

16. The method of claim 15, further comprising determining the first reverse direction indication by setting a reverse direction field in a quality of service frame.

17. The method of claim 15, wherein the frame comprises an MU-MIMO media access control protocol data unit (MPDU) frame or an acknowledgment request frame.

18. The method of claim 15, wherein the frame includes at least in part an order at which the one or more devices are to send their respective acknowledgment frames.

* * * * *